United States Patent
Spector

(10) Patent No.: US 7,965,995 B2
(45) Date of Patent: Jun. 21, 2011

(54) APPARATUS AND METHOD FOR BROADCASTING MESSAGES TO SELECTED GROUP(S) OF USERS

(76) Inventor: Shelley J. Spector, Short Hills, NJ (US)

( * ) Notice: Subject to any disclaimer, the term of this patent is extended or adjusted under 35 U.S.C. 154(b) by 858 days.

(21) Appl. No.: 11/805,951

(22) Filed: May 25, 2007

(65) Prior Publication Data

US 2007/0232261 A1 Oct. 4, 2007

(51) Int. Cl.
*H04M 11/04* (2006.01)
(52) U.S. Cl. ............... 455/404.2; 455/402; 455/412.1; 455/456.1; 455/456.3
(58) Field of Classification Search .............. 455/404.2, 455/412.1, 456.1, 456.3, 456.6, 457
See application file for complete search history.

(56) References Cited

U.S. PATENT DOCUMENTS

| | | | |
|---|---|---|---|
| 4,371,871 A | 2/1983 | Adams | |
| 5,278,539 A | 1/1994 | Lauterbach et al. | |
| 5,533,107 A | 7/1996 | Irwin et al. | |
| 5,740,235 A | 4/1998 | Lester et al. | |
| 5,754,111 A | 5/1998 | Garcia | |
| 5,805,670 A | 9/1998 | Pons et al. | |
| 5,896,298 A | 4/1999 | Richter | |
| 5,912,947 A | 6/1999 | Langsenkamp et al. | |
| 5,942,986 A | 8/1999 | Shabot et al. | |
| 6,002,748 A | 12/1999 | Leichner | |
| 6,151,385 A | 11/2000 | Reich et al. | |
| 6,201,856 B1 | 3/2001 | Orwick et al. | |
| 6,240,069 B1 * | 5/2001 | Alperovich et al. | 370/260 |
| 6,269,249 B1 | 7/2001 | Ochiai | |
| 6,269,369 B1 | 7/2001 | Robertson | |
| 6,295,346 B1 | 9/2001 | Markowitz et al. | |
| 6,366,771 B1 | 4/2002 | Angle et al. | |
| 6,400,810 B1 | 6/2002 | Skladman et al. | |
| 6,400,942 B1 | 6/2002 | Hansson et al. | |
| 6,405,135 B1 | 6/2002 | Adriany et al. | |
| 6,405,204 B1 | 6/2002 | Baker et al. | |
| 6,442,241 B1 | 8/2002 | Tsumpes | |
| 6,496,568 B1 | 12/2002 | Nelson | |
| 6,504,909 B1 | 1/2003 | Cook et al. | |
| 6,509,833 B2 | 1/2003 | Tate | |

(Continued)

FOREIGN PATENT DOCUMENTS

EP 0736989 A3 10/1996

(Continued)

OTHER PUBLICATIONS

Nerac Question 1058883.238.

(Continued)

*Primary Examiner* — Joseph H Feild
*Assistant Examiner* — Huy D Nguyen
(74) *Attorney, Agent, or Firm* — Cowan, Liebowitz & Latman, P.C.; Mark Montague, Esq.; Yelena Morozova, Esq.

(57) ABSTRACT

There is disclosed a method and apparatus for transmitting a message to at least one group of users selected from a population of the users. The method comprises the steps of assigning to each member of the one group a common characteristic or indication, collecting from each member of the population an address to which the message may be sent, selecting the common characteristic of a group of message recipients and determining therefrom the users of a particular group or groups based upon the selected common characteristic, whereby messages may be quickly and efficiently sent to all of the users of the selected group(s).

12 Claims, 6 Drawing Sheets

U.S. PATENT DOCUMENTS

| | | |
|---|---|---|
| 6,510,207 B1 | 1/2003 | Cannon et al. |
| 6,529,136 B2 | 3/2003 | Cao et al. |
| 6,535,121 B2 | 3/2003 | Matheny |
| 6,539,302 B1 | 3/2003 | Bender et al. |
| 6,545,606 B2 | 4/2003 | Piri et al. |
| 6,549,904 B1 | 4/2003 | Ortega et al. |
| 6,556,664 B1 | 4/2003 | Langsenkamp |
| 6,563,910 B2 | 5/2003 | Menard et al. |
| 6,574,480 B1 | 6/2003 | Foladare et al. |
| 6,574,630 B1 | 6/2003 | Augustine et al. |
| 6,580,784 B2 | 6/2003 | Rodriguez et al. |
| 6,587,851 B1 | 7/2003 | Ditcharo et al. |
| 6,590,507 B2 | 7/2003 | Burns |
| 6,591,094 B1 | 7/2003 | Bentley |
| 6,600,928 B1 | 7/2003 | Ahya et al. |
| 6,606,502 B1 | 8/2003 | Chung Kam Chung et al. |
| 6,631,363 B1 | 10/2003 | Brown et al. |
| 6,650,429 B2 | 11/2003 | Marshall et al. |
| 6,684,265 B2 | 1/2004 | Graf |
| 6,690,661 B1 | 2/2004 | Agarwal et al. |
| 6,700,482 B2 | 3/2004 | Ververs et al. |
| 6,711,410 B1 | 3/2004 | Nakajima |
| 6,781,963 B2 | 8/2004 | Crockett et al. |
| 2001/0014607 A1 | 8/2001 | Furukawa et al. |
| 2001/0046064 A1 | 11/2001 | Kulakowski et al. |
| 2002/0002590 A1 | 1/2002 | King et al. |
| 2002/0052194 A1 | 5/2002 | Sivakumar |
| 2002/0059457 A1 | 5/2002 | Ballard et al. |
| 2002/0087740 A1 | 7/2002 | Castanho et al. |
| 2002/0128033 A1 | 9/2002 | Burgess |
| 2003/0052778 A1 | 3/2003 | Wong et al. |
| 2003/0069002 A1 | 4/2003 | Hunter et al. |
| 2003/0076932 A1 | 4/2003 | Andrew et al. |
| 2003/0140091 A1 | 7/2003 | Himmel et al. |
| 2003/0141971 A1 | 7/2003 | Heiken |
| 2003/0153343 A1 | 8/2003 | Crockett et al. |
| 2003/0231619 A1 | 12/2003 | Akrutk |
| 2004/0015294 A1 | 1/2004 | Kirtland |
| 2004/0019647 A1 | 1/2004 | Lee et al. |
| 2004/0093433 A1* | 5/2004 | Armbruster et al. .......... 709/247 |
| 2006/0046699 A1 | 3/2006 | Guyot et al. |
| 2007/0192358 A1* | 8/2007 | Nagda et al. ................. 707/102 |

FOREIGN PATENT DOCUMENTS

| | | |
|---|---|---|
| EP | 1033844 A2 | 9/2000 |
| EP | 1143361 A1 | 10/2001 |
| EP | 1239385 A1 | 9/2002 |
| EP | 0867846 B1 | 6/2003 |
| EP | 1239385 B1 | 7/2003 |
| EP | 1339002 A1 | 8/2003 |
| EP | 1343103 A2 | 9/2003 |
| WO | 0045607 A1 | 8/2000 |
| WO | 0113670 A1 | 2/2001 |
| WO | WO 01/24059 | 4/2001 |
| WO | 0149368 A1 | 7/2001 |
| WO | 0193667 A1 | 12/2001 |
| WO | 0217192 A1 | 2/2002 |
| WO | 0237393 A2 | 5/2002 |
| WO | 02071365 A1 | 9/2002 |
| WO | 02073478 A1 | 9/2002 |
| WO | 02082402 A3 | 10/2002 |
| WO | 03053006 A1 | 6/2003 |
| WO | WO 2004/084532 | 9/2004 |

OTHER PUBLICATIONS

No Author, Health Management Technology, vol. 24, No. 8, pp. 48, 203 Nelson Publishing.
Nerac Question 1058883.235.
No Author, Electrosvyaz, No. 12, pp. 46, 2001.
Kym Secrist, Control Engineering v. 44, n. 3, Mid-Fed. 1997, pp. 27-28.
Dan Verton, Computerworld, v. 37, n. 35, Sep. 1, 2003, pp. 10.
W.T. Brandon, Space Communications, vol. 18 No. 3-4, 2002, pp. 113-118.
Shafer et al., Journal of Atmospheric and Oceanic Technology, vol. 17, No. 4, Apr. 2000, pp. 474-494.
Shulzrinne et al., Proceedings of the SPIE—The International Society for Optical Engineering, vol. 4868, 2002, pp. 255-268.
I.E. McDermott, Searcher, vol. 9, No. 9, Oct. 2001, pp. 58-62.
Schulzrinne et al., IEEE Internet Computing, vol. 6, No. 3, May-Jun. 2002, pp. 39-47.

* cited by examiner registration database control panel                                     80

Database Function

View Database

Send Warning email to registrants

Subject

Zip Code(s) (Please select one of the following options:)

82 — ◉ Zip codes by region

- 82a — Northeast & Central Queens
- 82a — Northeast Brooklyn
- 82b — Northern Bronx
- Northern Manhattan
- Northwest Brooklyn
- Northwest Queens
- Southeast Queens
- 82n — Southern Bronx
- Southern Brooklyn
- Southern Manhattan 84a — Add>>
84b — <<Remove 83 — ◉ Store region

FIG.3A registration database control panel                                     80

Database Function

View Database

Send Warning email to registrants

Subject

Zip Code(s) (Please select one of the following options:)

82 — ◉ Zip codes by region

- 82a — Northeast & Central Queens
- 82a — Northern Bronx
- 82b — Northern Manhattan
- Northwest Brooklyn
- Northwest Queens
- Southeast Queens
- 82n — Southern Bronx
- Southern Brooklyn
- Staten Island 84a — Add>>
84b — <<Remove 86a — Southern Manhattan
86b — Northeast Brooklyn
86

FIG.3B

90
Add regions from the list on the left in the priority order you want the e-mails to be sent.
Only users with zip codes that match the selected region(s) will receive the message.

92 — ⊙ Type zip code(s)    [_____] — 93
                           Enter multiple zip codes separated by commas.
94 — ⊙ Send to ALL zip codes  By selecting this option, a warning e-mail will be
                              forwarded to ALL registrants in the database.
Send e-mails to these areas first, regardless of the above zip codes selection:
95a — ☐ Major transportation hubs
95b — ☐ City Landmarks
Message                    Warning Type
                    96 — [ Aircraft crashes                    ⬧]

97 — [                                    ]
                                          [Count Characters]
☐ (message may not exceed 150 characters)
Type warning message in the above text area. You may also select a warning type
from the pull-down menu, which places a warning in the text area. You may edit the
message at any time before sending it.
                98 — [ Send Message ][ Reset ] — 99

Warning: When you click the "Send Message" button, an e-mail will be forwarded to all
or selected registrants. This process cannot be stopped or cancelled.
Please click the button ONLY ONCE.

FIG.3C

90
⊙ Type zip code(s)    [_____]
                      Enter multiple zip codes separated by commas.
94 — ⊙ Send to ALL zip codes   ✓ Aircraft crashes — 100a
                               Building Failure — 100b
Send e-mails to these areas   Dam Breaks
☐ Major transportation hubs   Earthquakes
☐ City Landmarks              Environmental- Air/water soil pollution
Message                       Fire
                              Hazardous Materials
                              Health & Biological- Anthrax
                              Health & Biological- Botulism
                              Health & Biological- Cyanide
                              Health & Biological- Epidemics
☐ (message may not exceed 150 char)  Health & Biological- Epizootics
Type warning message in th    Health & Biological- Poisonings Intoxication — 100'
from the pull-down menu, wh   Health & Biological- Ricin
message at any time before    Health & Biological- Sarin
                              Health & Biological- Smallpox
                  [ S         Health & Biological- VX
Warning: When you click the   Industrial Accidents- BLEVE
           or selected regis  Industrial Accidents- Explosions
                    Pl        Industrial Accidents- Gas leaks         — 100n
                              Industrial Accidents- Radioactive emissions
                                                                      — 100

◉ Type zip code(s) [                    ]
Enter multiple zip codes separated by commas.
◉ Send to ALL zip codes  By selecting this option, a warning e-mail will be forwarded to ALL registrants in the database.
Send e-mails to these areas first, regardless of the above zip codes selection:
☐ Major transportation hubs
☐ City Landmarks Message                Warning Type
                       [Health & Biological- Ricin          ⬍]

97 — [Emergency-[Health & Biological-Ricin], stay away from the affected area. Avoid enclosed areas. Follow instructions from emerg. crew.]     102
                                                                                                                    [Count Characters]

103 — [138] (message may not exceed 150 characters)
Type warning message in the above text area. You may also select a warning type from the pull-down menu, which places a warning in the text area. You may edit the message at any time before sending it.
                    98 — [Send Message] [Reset] — 99
Warning: When you click the "Send Message" button, an e-mail will be forwarded to all or selected registrants. This process cannot be stopped or cancelled.
Please click the button ONLY ONCE.

FIG.3E

APPARATUS AND METHOD FOR BROADCASTING MESSAGES TO SELECTED GROUP(S) OF USERS

FIELD OF THE INVENTION

This invention relates to broadcasting to a group(s) or subset(s) of users in a manner that effects the efficient selection of the user to receive the message and to permit the transmitted message to be customized to the needs of the users.

BACKGROUND OF THE INVENTION

Since Sep. 11, 2001, the need to warn people of threatened property damage and personal injury from a variety of natural and man-made potential disasters has been seen as a high priority need. Typical threatened disasters include natural disasters from weather, such as tornados, hurricanes, mud slides, floods and wind shear, as well as man made disasters, such as those resulting from terrorist attacks, fire, radiation leakage, toxic chemical leakage or bomb threats. Ordinarily, the earlier people and communities are alerted to such threats so that they can make preparations for protecting themselves from them, the less the property damage or personal injury resulting from these threatened disasters.

It is estimated by the partnership for Public Warning that nearly a thousand people involved in the September 11 attack could have escaped the second tower in time to save their lives, had they been able to receive accurate information about what was going on. When the first plane hit, it blew out the electricity, phone lines, and cellular towers. This meant the occupants had no sources of information, relying instead on the inaccurate instructions of the building superintendent, who told everyone to remain at their desks.

Further, the Emergency Alert System (EAS) was not activated that day (for no known reason). But even if it did activate, it would have done nothing to help people most in peril, since they had no access to radio and TV, the only mediums the EAS is authorized to use.

What was needed was a ubiquitous mobile system that could be used in the absence of power and phone lines, to reach people in high risk areas, with government sanctioned information about the emergency, customized per location, and specific, ongoing instructions for post event safety.

There are already in place and operational a variety of prior art systems for warning or alerting people to disaster threats. These most prominently include the public media, such as radio and television news and weather broadcasts and the weather radio system operated by the National Weather Service. These systems, however, are subject to deficiencies because they require radio transmissions broadcast from transmitters located in the region of the disaster, and require that individuals have their radio or television equipment turned on, operating and being observed by the individuals. Persons who are not operating such equipment do not receive an alert, unless they are fortunate enough to have someone nearby who has received the alert and who is aware of their presence and goes to the effort to give them a personal warning.

Additionally, there are siren warning systems to alert members of the public who are in danger of a threatened disaster. These systems are also subject to deficiencies because some areas are not equipped with such siren warning systems and the sirens can be difficult or impossible to hear when there is ambient noise, such as from construction or traffic or a heavy storm or when the sirens are simply too far off to be heard.

There are also a variety of additional warning systems, mostly radio operated, which require specialized equipment. Very few people purchase such equipment and therefore these systems are not effective in providing sufficient warning to large numbers of people.

The infrastructure of the United States and many other countries currently includes a national telephone system which provides a communication system which is widely distributed and provides the most personal route to connection to the greatest number of people.

However, the present warning systems suffer a number of deficiencies. First, they do not have the capability of automatically sending a message to a particular group of message recipients. In emergency situations, it is important to be able to warn or to alert those who are in immediate danger and/or those recipients who are police or firefighters and who would respond to such emergencies. Further, it is important for those in authority and who are authorized to respond quickly to such emergencies, be alerted first. Others, for example those who are in harms way, must also be alerted though at a latter time. Thus, it would be important to have an effective warning system with the ability to prioritize the messages that are broadcast; for example, it would be desirable to send a first set of messages to certain users, e.g., officers in a fire department or the police, before sending a set of messages to those in the area, which is threatened by the emergency.

Still further, it is appreciated that each group of users may require a different message. In such a case, the broadcast alerting system would need to send different, customized messages to each of these groups of people, e.g., a first message to the police and another, different message to those residing in the region where the emergency has occurred.

SUMMARY OF THE INVENTION

It is therefore an object of this invention to provide a new and improved message broadcast system that is capable of quickly and efficiently sending a message via a data transmission medium to a selected number of message recipients or users.

It is a further object of this invention to provide a new and improved message broadcast system that is capable of customizing the transmitted message to the particular group of people and/or to the nature of the event that may potentially affect this group.

It is a still further object of this invention to provide a new and improved message broadcast system that can prioritize the sending of a message to that one of the groups of people, which has the greatest need to receive the message.

In accordance with these and other objects of this invention, a method of transmitting a message to at least one group of users selected from a population of users is disclosed. The method comprises assigning to each member of the one group a common characteristic, collecting from each member of the population an address to which the message may be sent, selecting the common characteristic, determining each user of the group according to the selected common characteristic, and selecting a message and transmitting the selected message to each member of the selected group.

In accordance with another object of this invention, the common characteristic may include a region to which the user is associated.

In accordance with a further object of this invention, the step of transmitting a message captures the stored address and inserts it into the message, whereby the message is sent to each user of the group with the common characteristic.

In accordance with a still further aspect of this invention, apparatus is disclosed for transmitting a message to a plurality of group(s) of users selected from a population of users. The apparatus comprises a database; and a server programmed to implement the following steps: 1) facilitating each member of the population of users to transmit via an Internet and to store in said database an address whereby a message may be sent to that user, and 2) facilitating each user to select a characteristic of the group to which the user belongs and to store the selected characteristic in the database.

In accordance with a further object of this invention, the server is further programmed to facilitate an administrator to select and to transmit via the Internet a characteristic to the server, determining each user of the group which has the selected common characteristic, and transmitting a selected message to each determined member of the group with the common characteristic.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views and in which:

FIGS. 3A and B, and C-E respectively illustrate a first web page or screen showing how the group characteristic for a particular message is selected, and how a message is selected and/or composed.

DETAILED DESCRIPTION OF A PREFERRED EMBODIMENT OF THE INVENTION

Figure 1:
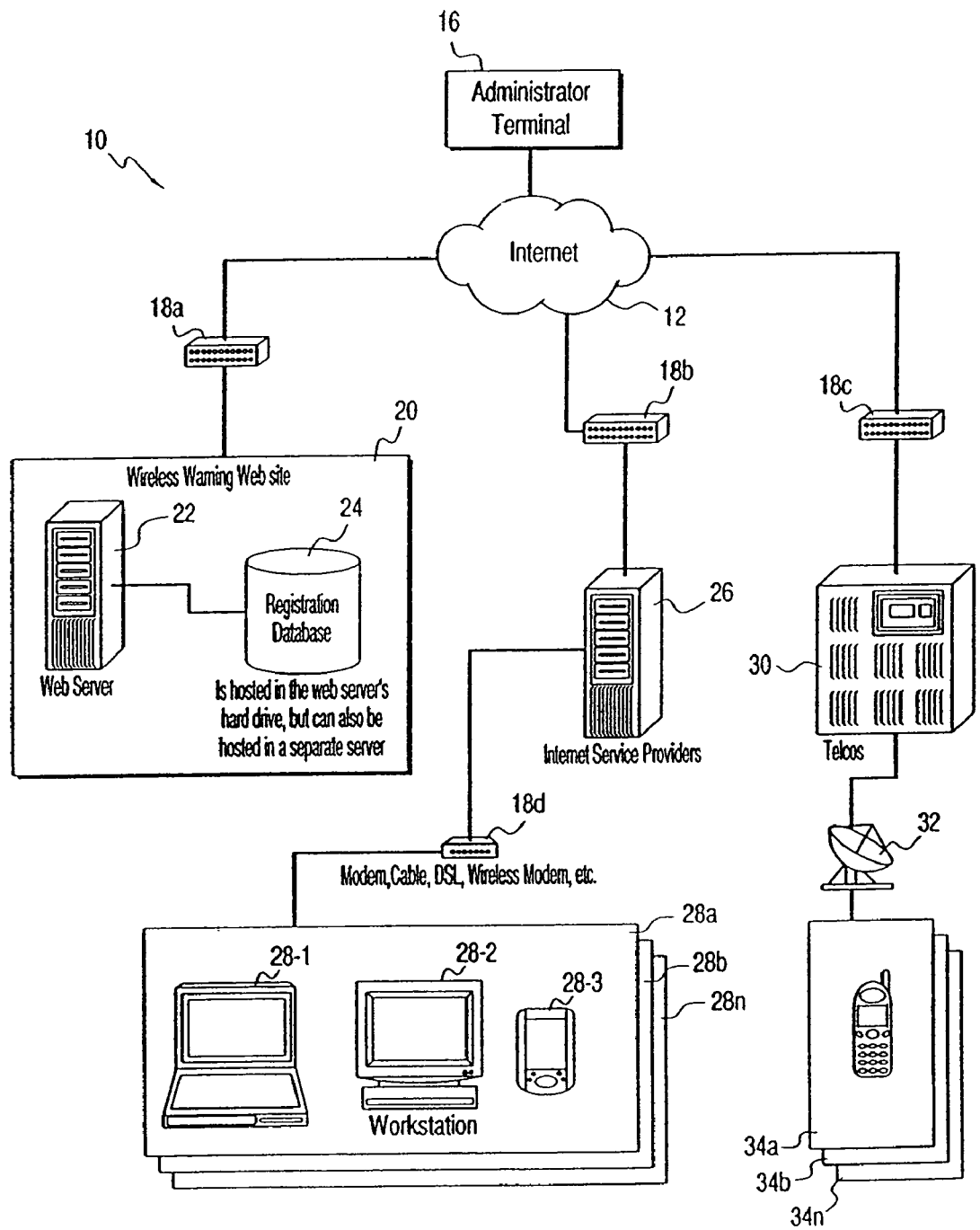
FIG. 1 is a functional block diagram illustrating how a user's terminal, an administrator's terminal and a server of a website are used to send messages to a group or groups of users where each group has a common characteristic.

Referring now to the drawings and in particular to FIG. 1, there is shown an illustrative embodiment of this invention which uses a message broadcast system 10 to broadcast or transmit messages to a selected group(s) or subset(s) of a population of users or message recipients. The system 10 comprises a plurality of user terminals 28a-n and 34a-n, and an administrator terminal 16, each of which is interconnected by a bi-directional network to a website 20. The website 20 in turn comprises a web server 22 and a registration database 24 where, as will be explained below in greater detail, data related to the users is stored. The web server 22 operates as will be explained in detail below to transmit or broadcast messages in a first direction either via a modem 18a, the Internet 12, a modem 18b and an Internet Service Provider (ISP) 26 to the terminals 28a-n, or via the modem 18a, the Internet 12, a modem 18c, a telecommunications provider 30 and a wireless communication device 32 to the terminals 34a-n. The system 10 is capable of transmitting text and voice messages. To transmit text messages, the system 10 utilizes the ISP 26 and a variety of the terminals 28a-n such as a personal computer (PC) 28-1, a workstation 28-2 and/or a personal digital assistant (PDA) 28-3. In a wireless voice embodiment, the system 10 includes cell phones 34a-n, the telecommunications provider 30 and the wireless communication device 32. As will be explained below, each of the terminals 28a-n and 34a-n can transmit signals in a second opposite direction via the modems and the Internet 12 to the website 20.

Figure 2A:
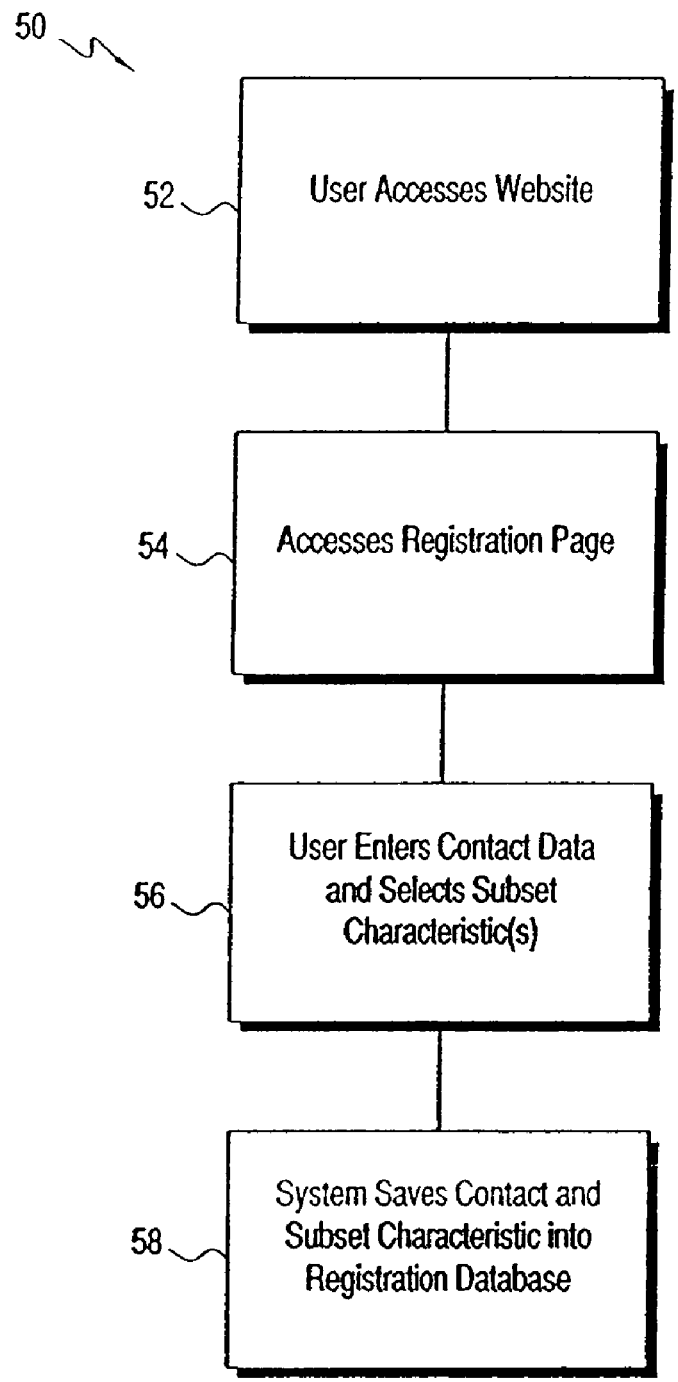
FIGS. 2A and B are flow diagrams, which respectively prompt a user to input contact data and to identify the characteristic of the group to which the user is associate, and to transmit a message to each member of a group having the characteristic selected by the administrator.

Referring now to FIG. 2A, there is disclosed how the web server 22 may be set up as a website 20, which each of the users may access to input contact and other data into the registration database 24. First in step 52, the user accesses the website 20 by use of the terminals 28a-n and 34a-n and, in step 54, accesses from the registration database 24 a web page to be displayed on the terminal 28 or 34 in the form of the registration page or screen 80, as shown in FIG. 3A. In an illustrative embodiment of this invention, the web server 22 is programmed to receive and store a data characteristic or indication of a group or subset of the users. In an illustrative embodiment of this invention, the characteristic or common criteria of the group or subset of users may take the form of a zip code of the user's residence, place of business or related in some fashion to the user. Upon display in step 54 of the registration screen 80, the user may manually actuate in step 56 a button 82 to permit the user to select certain region(s) that correspond to a particular zip code(s). As shown in FIG. 3A, various regions of the boroughs of New York City are set out, each region corresponding to a particular zip code(s). To select one or more such regions, the user clicks on one of the regions 82a-n and associates that region to the user's contact data by clicking on the add button 84a, whereby as shown in FIG. 3B, these selected regions, e.g. southern Manhattan 86a and northern Brooklyn 86b, are added to a display field 86.

Further, the data secured from the user would also include the web addresses of the terminals 28, as well as the telephone numbers of the cell phones 34, whereby messages may be directed to certain terminals as set by the user. Though not shown in FIGS. 3A, B and C, the web pages are shown to the user at their terminals 28a-n and 34a-n to prompt the user to input contact data, an indication of the group or subset characteristic as described above, and the addresses of the terminals 28 and 34. After the contact data, the subset characteristic and the terminal addresses have been entered in step 56, the user actuates a button 83 (FIG. 2A) to save in step 58 the user's contact data and the subset characteristic to the registration database 24.

Figure 2B:
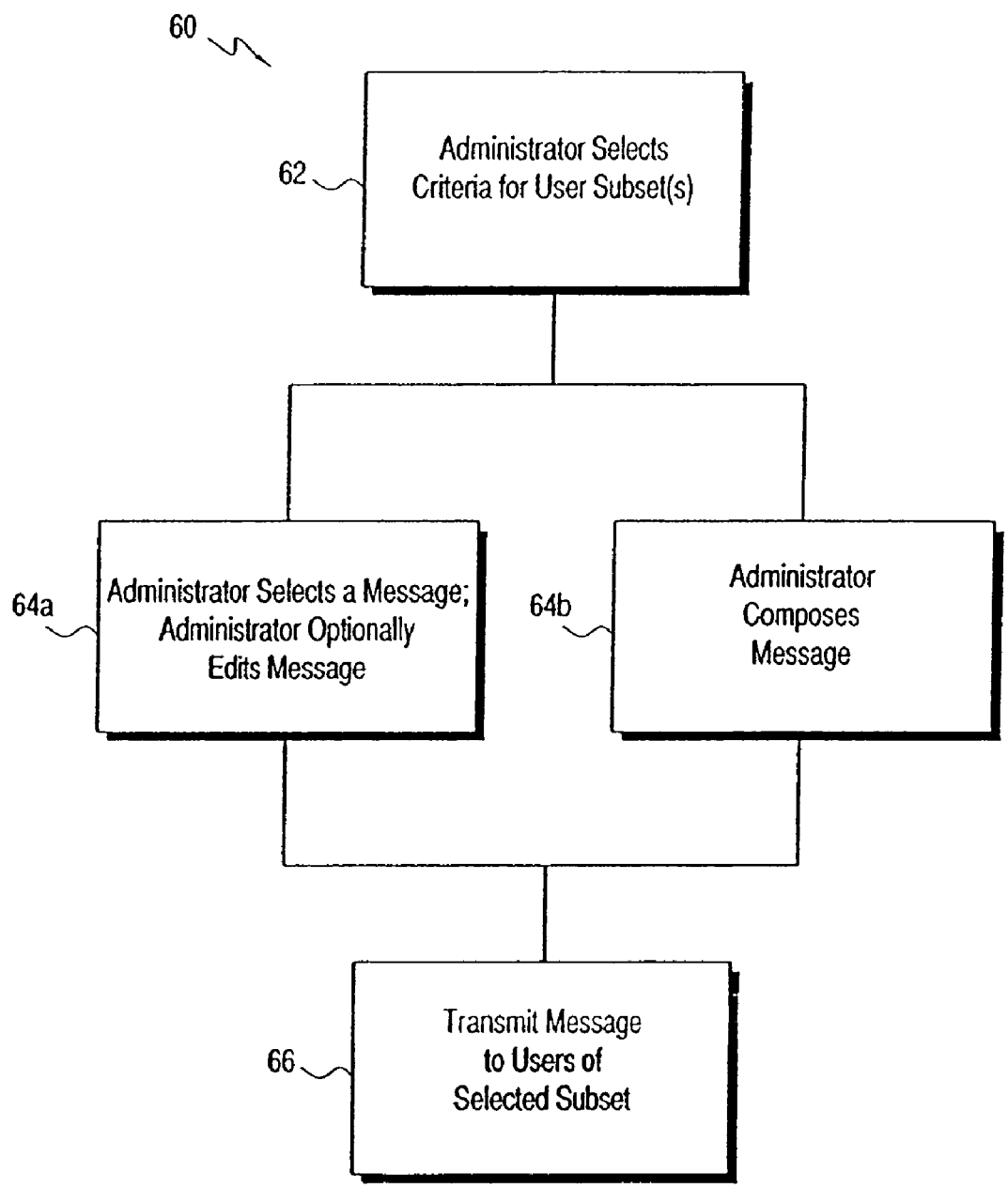

Referring now to FIG. 2B, there is shown a process by which an administrator using its administrator terminal 16 as shown in FIG. 1 is enabled to provide a selective message to be sent to a selected one or more of the subset(s) or group(s) of users. As shown in FIG. 2B, the administrator using his terminal 16 downloads in step 62 a screen 90 as shown in each of FIGS. 3C, D and E. As shown particularly in FIG. 2B, the administrator may selectively choose in step 62 the criteria for the user subset(s) or group(s) by clicking on a button 92 of the screen 90 (FIG. 3C). In the illustrative embodiment where the group criteria is in the form of a geographical region and/or zip code(s), the administrator enters at least one zip code into the field 93. The administrator may also enter a number or plurality of zip codes and may place them in the order in which messages are to be transmitted to the groups of users that are identified by those zip codes.

After selecting and entering the criteria for the user subset, the administrator is then ready to select in steps 64a and b a message to the users of the selected group of users. The administrator may provide the message to be sent to a selected group or subset of users in at least two different ways. In step 64a as shown in FIG. 2B, the administrator may select a message to be broadcast from a group of possible messages.

In particular, the user may click on its "warning type field" 96 (FIG. 3C), where a pop up menu 100 appears upon the screen 90 as shown in FIG. 3D listing the various types of warnings or messages that may be sent. The administrator selects one of the messages by clicking thereon to illustratively select the "health & biological-Ricin" message 100'. Optionally, the administrator may display in the field 97 a previously selected message and edit it. Alternatively, the administrator may compose in step 64b and type a particular message in its data input field 97 as shown in FIG. 3C.

The administrator also has the option to actuate in step 66 a button 98 (FIG. 3E), whereby messages are sent to all of the entered zip codes as shown in FIG. 3C. The administrator is also given the option to not only send messages to the zip code or codes, but may also send the message to selected other areas of particular priority. For example, the administrator may actuate a button 95a, whereby the message is sent to the major transportation hubs, or a button 95b whereby the message is sent to the landmarks of a particular city. A reset button 99 is also displayed by the screen 90, providing the administrator an opportunity to change and/or correct the various settings that the administrator has made in step 62, 64 and 66.

As shown in FIG. 3E, there is associated with the message entry field 97, a field 102 which permits the web server 22 to count the characters comprising the messages entered in the message field 97 whereby the number of characters in a message may be limited. The current number of characters in the message being prepared and the total number of permissible characters are shown in the field 103 to the administrator.

In step 66 (FIG. 2B), the web server 22 (FIG. 1) accesses the contact data and the group criteria as stored in the registration database 24 and, using the address or addresses of each user, transmits a message to each user of the selected group or subset. As shown in FIG. 1, the web server 22 transmits these messages via the Internet 12 to each of the ISPs 26 and/or the telecommunication provider 30. Each transmitted message, as explained above, includes an address identifying the particular terminal 28a-n or 34a-n that the user has designated for receipt of its message. For example the selected terminal may take the form of the PC 28-1, the work station 28-2 or a PDA 28-3. It is contemplated that a particular user may have a terminal 28 for receiving text messages but also may have a portable wireless device such as a cell phone 34 for receiving voice messages. In that instance, the message would bear the telephone number of that cell phone 34 and would be sent via the telecommunication provider 30, the wireless transmission system 32 to one of the cell phones 34.

In a preferred embodiment of this invention, the short message service (SMS) is used as the primary mode of communications over cell phones dramatically thereby reducing the overages in capacity felt in both 9/11 and the 2003 blackout in the Northeast. A public service campaign to educate citizens about the system would necessarily admonish people to use only SMS in times of emergency, and only with "necessary" communications. This must be done to protect the integrity of the cell phone system, and prevent it from collapsing beneath the weight of voice and multimedia messaging, such as photos and other images.

In the illustrative embodiment of this invention described above, the criteria, attribute or characteristic of the group or subset was selected as a zip code. In that embodiment, the administrator can quickly address a plurality of messages to each of the users within the selected group or subset, e.g., to each member that is within the selected zip code or zip codes. However, this invention is not limited to the use of zip codes as categories. For example the criteria could take the form of the title or function of the user. For example if this invention were to be employed to send messages of some emergency or disaster, the criteria maybe selected in terms of the function or title of the users. If the contemplated users were police or fireman, the criteria maybe selected in terms of the rank or function of a particular officer. For example, it may be desired to send messages only to those firemen or policemen of a certain rank. As indicated above, the messages may be sent in order of priority. In a contemplated disaster, it would be desirable to send the first warning messages of an accident or disaster to high ranking officers or firemen so that they may take immediate control of the situation. In a further illustrative example of this invention as related to the sale of securities, the group criteria may identify users who own a particular security. Thus this invention could be used to send messages about a certain stock to the holders of that stock. In this example, the group criteria would be ownership of that stock.

This invention is of use when one needs to instantly reach hundreds or even millions of people simultaneously, wherever those people may be scattered. The messages can be sent to selected recipients dependent on the characteristics or identifications of a recipient, including location, ranking, title or specific informational requests by recipient, such weather, traffic, horse races, or specific lottery drawings. Other uses include localized rush hour alerts (tie ups at one tunnel, so use another) and classify users by those zip codes in which travelers are most interested in, as well as bridges, tunnels, and/or highways. Messages may be broadcast from schools (no school today for certain grades) where schools or students are classified by zip codes, by school grade, or by a particular teacher. Corporate broadcasts may be made to employees around the world, by title, country, division, or those most affected by a certain type of news or event. Messages may be sent that warn of disease outbreaks to people who have recently traveled to a certain country, were recently diagnosed with related symptoms, to patients of a certain doctor, or to those who have recently been on a plane with a highly contagious passenger.

In a further application, this invention may also be applied to other events. In the context of reporting results of racing events, the group criteria may identify users who would like to be informed of races that take place on a given day, at a certain track, during a specific race or races, or featuring a given horse or rider. In the example of reporting, the results of lotteries, the group may identify users who would like to be informed of lottery results in given states, or of multi-state lottery games, or games ending on specific dates or succession of dates that winning numbers are announced. In the context of scheduling of airline flights, the group criteria may identify users who would like to be informed of departure and arrival times, as well as delays, cancellations, and alternative available flights. This invention could be adapted to report the results of sporting events, where the group criteria relates to selected teams, leagues, players, or school teams, and scores by inning, quarter, or the whole game. This invention also has application to reporting election results, and weather forecasts for certain regions.

Although the present invention has been described in terms of various embodiments, it is not intended that the invention be limited to those embodiments. Modification within the spirit of the invention will be apparent to those skilled in the art. The scope of the present invention is defined by the claims that follow.

I claim:

1. A method of transmitting a message by a communication system to at least one group of users selected from a population of users, said method implemented over the Internet, said method comprising:
   a) assigning to each member of the one group a common characteristic;
   b) collecting, by the communication system, from each member of the population an address to which the message may be sent, wherein a server of the communication system is programmed to download over the Internet a screen prompting a user to input the address to which the message may be sent and the address is saved in a database of the communication system;
   c) providing, by the communication system, a selected message;
   d) selecting the common characteristic;
   e) determining each user of the group with the selected common characteristic; and
   f) transmitting, by the communication system, the selected message to each member of the group with the selected characteristic, the transmitting comprising: capturing the stored address of the member and inserting the captured address into the message, whereby the message is sent to each user of the group with the common characteristic.

2. The method of transmitting as claimed in claim 1, wherein the common characteristic is a region to which the user is associated.

3. The method of transmitting as claimed in claim 2, wherein the region includes at least one zip code.

4. Apparatus for transmitting a message to a plurality of groups of users selected from a population of users, said apparatus comprising:
   a) a database; and
   b) a server programmed to implement the following steps:
      1) facilitating each member of the population of users to transmit via an Internet and to store in said database an address whereby the message for that user may be sent to the user by providing a screen prompting the user to input the address;
      2) facilitating each user to select a characteristic of the group to which the user belongs and to store the selected characteristic in said database;
      3) facilitating an administrator to select and to transmit via the Internet a characteristic to the server;
      4) determining each user of the group which has the selected common characteristic, and
      5) transmitting a selected message to each member of the group with the common characteristic, wherein the transmitting comprises capturing the stored address of the member and inserting the captured address into the message, whereby the message is sent to each user of the group with the common characteristic.

5. Apparatus for transmitting a message as claimed in claim 4, wherein said apparatus comprises a plurality of user terminals, each of said plurality of terminals facilitate a corresponding user to select the common characteristic of the group to which the users belong.

6. Apparatus for transmitting a message as claimed in claim 5, where each of said plurality of user terminals is connected by the Internet to said programmed server.

7. Apparatus for transmitting a message as claimed in claim 5, where there is further included a message communication system for transmitting messages to one of said terminals of the user.

8. Apparatus for transmitting a message as claimed in claim 7, wherein said message communicating system transmits messages in the form of a text message to a portable text message receiving device.

9. Apparatus for transmitting a message as claimed in claim 8, wherein said portable message text message receiving device is selected from a group comprising, a portable personal computer, a workstation and a portable digital assistant.

10. Apparatus for transmitting a message as claimed in claim 9, wherein there is further included an internet service provider which is connected to the internet to transmit messages from said server via said internet and said internet service provider to one of said portable message text receiving devices.

11. Apparatus for transmitting a message as claimed in claim 7, wherein said message transmitting system transmits messages in the form of an audio message to a portable audio message receiving device.

12. Apparatus for transmitting a message as claimed in claim 11, wherein there is further included a telecommunications provider which is connected to the internet to transmit messages from said server via said Internet and said telecommunication provider of said portable audio message receiving devices.

* * * * *

UNITED STATES PATENT AND TRADEMARK OFFICE
CERTIFICATE OF CORRECTION

| | | |
|---|---|---|
| PATENT NO. | : 7,965,995 B2 | Page 1 of 1 |
| APPLICATION NO. | : 11/805951 | |
| DATED | : June 21, 2011 | |
| INVENTOR(S) | : Shelley J. Spector | |

It is certified that error appears in the above-identified patent and that said Letters Patent is hereby corrected as shown below:

On the Title Page, Item (65) Prior Publication Data, add the following

This application is a continuation of 10/509,263, September 27, 2004, now U.S. Patent 7,224,957, which is a 371 of PCT/US40/07959, March 16, 2004, which claims benefit of 60/455,308, March 17, 2003.

Before first paragraph under the FIELD OF THE INVENTION, add the following paragraph This application is a continuation of 10/509,263, September 27, 2004, now U.S. Patent 7,224,957, which is a 371 of PCT/US40/07959, March 16, 2004, which claims benefit of 60/455,308, March 17, 2003.

Signed and Sealed this
Eighth Day of November, 2011

David J. Kappos
*Director of the United States Patent and Trademark Office*